United States Patent [19]

Nguyen

[11] Patent Number: 5,267,775
[45] Date of Patent: Dec. 7, 1993

[54] SYSTEM FOR MOUNTING A MONITOR

[75] Inventor: Lam Nguyen, Lake Elsinore, Calif.

[73] Assignee: B/E Avionics, Inc., Santa Ana, Calif.

[21] Appl. No.: 776,650

[22] Filed: Oct. 3, 1991

[51] Int. Cl.$^5$ ............................................. A47C 7/62
[52] U.S. Cl. .................................. 297/217; 297/191; 248/664
[58] Field of Search ................... 297/191, 146, 217; 248/664, 917, 919, 923; 312/7.2, 223.2

[56]  References Cited

U.S. PATENT DOCUMENTS

| | | | |
|---|---|---|---|
| 3,813,147 | 5/1974 | Rick | 297/191 |
| 4,141,586 | 2/1979 | Goldner et al. | 297/191 |
| 4,281,874 | 8/1981 | Iwans et al. | 297/163 |
| 4,431,231 | 2/1984 | Elazari et al. | 297/163 |
| 4,519,648 | 5/1985 | Jovanovic | 297/146 |
| 4,521,021 | 6/1985 | Dixon | 273/148 B |
| 4,584,603 | 4/1986 | Harrison | 358/86 |
| 4,630,821 | 12/1986 | Greenwald | 273/85 G |
| 4,630,862 | 12/1986 | Watanabe | 297/191 X |
| 4,756,528 | 6/1988 | Umashankar | 273/1 E |
| 4,813,743 | 3/1989 | Mizelle | 297/357 |
| 5,000,511 | 3/1991 | Shichijo et al. | 297/191 |

*Primary Examiner*—Blair M. Johnson
*Attorney, Agent, or Firm*—Kenyon & Kenyon

[57] ABSTRACT

An automatic tilt mechanism for attaching a monitor to a movable structure, comprising: a hinge having a first leg means for attachment to a monitor, a second leg means for attachment to the movable structure and a pivot joining the first and second leg means so that they can be moved with respect to each other after attachment; a transfer means adapted to move in proportion to movement of the movable structure; and a connecting means for transmitting movement of the transfer means to the hinge so that the first leg means moves proportionally to movement of the movable structure. The invention may further include a reclinable seat back of a seat in a passenger vehicle as the movable structure. The invention may still further include a fixed length sheathed cable as the connecting means. The invention may also provide an automatic tilt mechanism that is driven by motion of the seat back.

11 Claims, 3 Drawing Sheets

SYSTEM FOR MOUNTING A MONITOR

FIELD OF THE INVENTION

This invention pertains to a system for mounting a monitor that utilizes an automatic tilt mechanism to maintain a substantially constant viewing angle for the monitor. More particularly, the mechanism is for use in a seat back in a passenger vehicle.

BACKGROUND OF THE INVENTION

It is known in the prior art to rigidly mount a video or game monitor in the seat back of a passenger vehicle. In U.S. Pat. No. 4,756,528 to Umashankar, a TV screen and video system disposed in an upright position and recessed in a seat back is disclosed. Controls for the video system are located in an arm of the seat facing the TV screen. U.S. Pat. No. 4,584,603, discloses an amusement and information system for use in a passenger vehicle, including a monitor disposed on a seat back.

When a seat back is movable or reclinable and a monitor is rigidly mounted therein, the monitor remains in the same position relative to the seat back during movement, thereby, changing the viewing angle. Changing that angle may make viewing of the screen difficult.

Also known in the art is a monitor mounting system having a viewing angle that can be changed manually. Manually changing the monitor angle may cause discomfort for both the monitor viewer and a front seated passenger.

OBJECTS AND SUMMARY OF THE INVENTION

An object of the present invention is to provide a system for mounting a monitor in the seat back of a passenger vehicle.

Another object of the present invention is to provide a system for mounting a monitor that can automatically maintain a selected viewing angle throughout the normal range of movement of a structure in which the monitor is located.

Another object of the present invention is to provide a system for automatically maintaining a substantially constant viewing angle for a monitor mounted on a reclinable seat back as the position of the seat back changes.

Another object of the present invention is to provide a system for mounting a monitor which includes an automatic tilt mechanism that can maintain a selected viewing angle throughout the normal range of movement of a structure in which the monitor is located and that is driven by the motion of the seat back.

The present invention provides a automatic tilt mechanism for attaching a monitor to a movable structure, comprising: a hinge having a first leg means for attachment to a monitor, a second leg means for attachment to the movable structure and a pivot joining the first and second leg means so that they can be moved with respect to each other after attachment; a transfer means adapted to move in proportion to movement of the movable structure; and a connecting means for transmitting movement of the transfer means to the hinge so that the first leg means moves proportionally to movement of the movable structure. The invention may further include a reclinable seat back of a seat in a passenger vehicle as the movable structure and a transfer means that comprises a first arm fixedly attached to a portion of said seat, and a second arm attached to said seat back, said first and second arms being attached pivotally so that the first arm moves with the seat back relative to the second arm. The invention may also include a fixed length sheathed cable as the connecting means.

DETAILED DESCRIPTION

Figure 1:
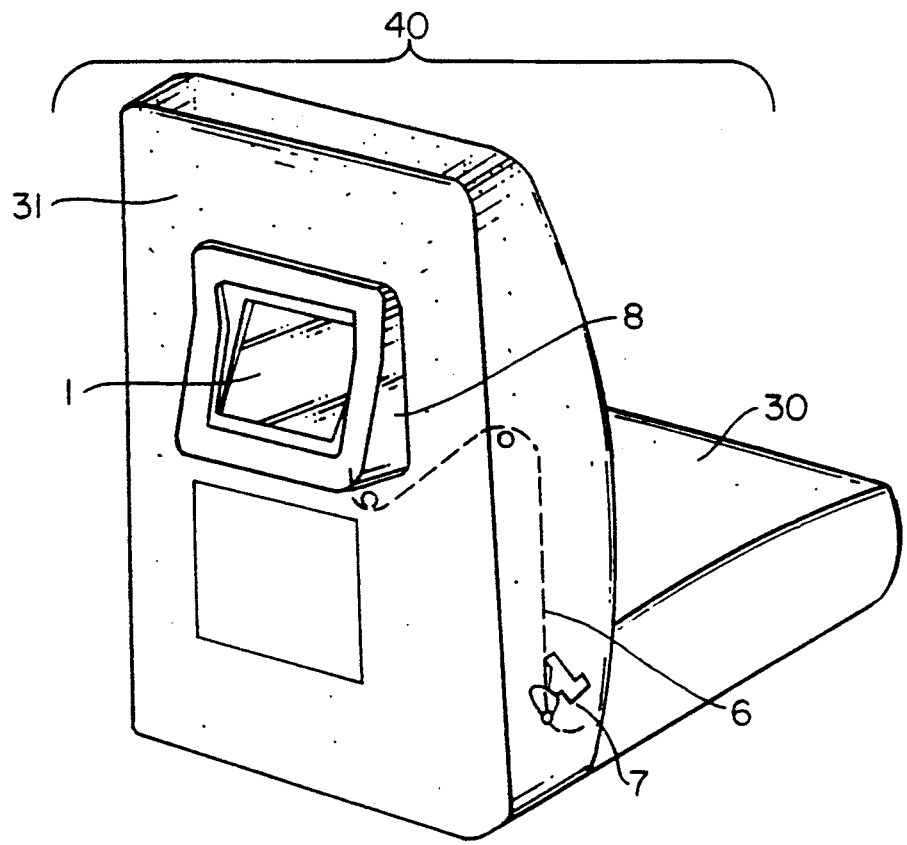
FIG. 1 is a complete view of the system including a passenger seat.

Referring to the drawings, wherein like reference numerals refer to like parts throughout the various figures, reference numeral 1 is directed to the video monitor mounted according to the present invention.

FIG. 1 shows the complete system 40 for mounting monitor 1. A monitor assembly 8 is located on a seat back 31. The seat back 31 is pivotally mounted on a seat part 30. This pivotal connection can be made in a conventional manner. The seat can be a conventional seat, i.e., a passenger seat in a vehicle.

Figure 2:
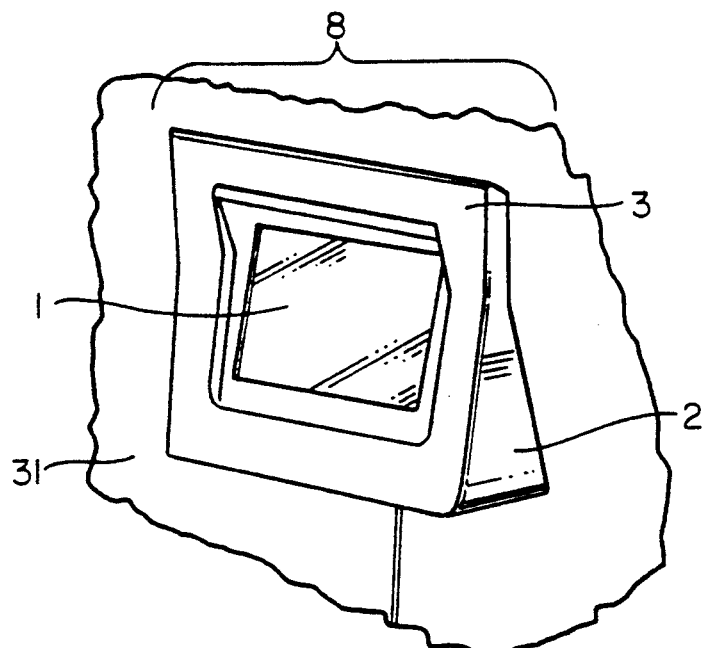
FIG. 2 is a partial view of a seat back with a monitor located therein.

FIG. 2 shows a monitor assembly 8 located within a housing 2 on the seat back 31 of a seat in a passenger vehicle. The housing 2 is a six sided structure with an open front side through which the monitor screen can be seen. The monitor assembly 8 is placed within this housing 2 and a cover 3 is placed over the open end of the housing 2. The cover 3 has an opening through which the monitor can be viewed.

The term monitor is used herein to refer to any type of viewing screen, including, but not limited to, video displays, CRTs, televisions and video monitors.

Figure 3:
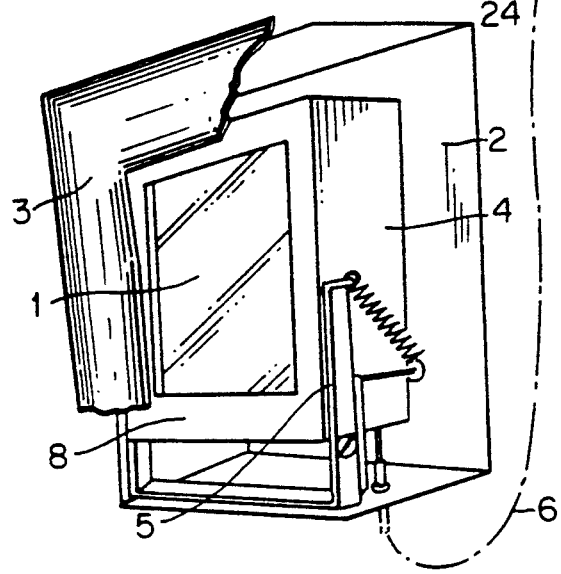
FIG. 3 shows a system for mounting a monitor constructed in accordance with the invention.
Figure 4:
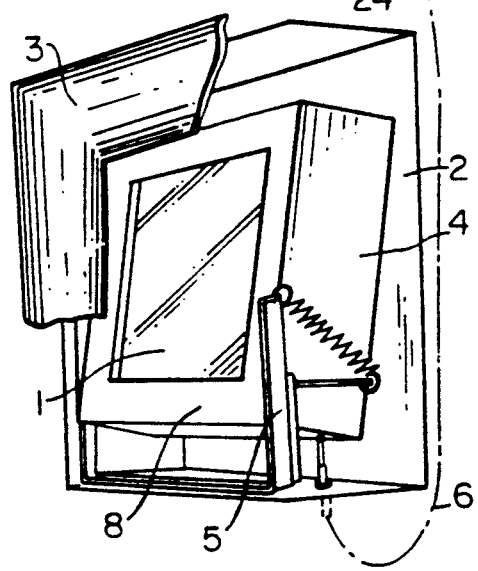
FIG. 4 is a similar view to FIG. 2 illustrating the monitor in a tilted position.

FIG. 3 shows a system for mounting a monitor 1 including an automatic monitor tilt mechanism. More particularly the system is for mounting a monitor on the seat back in a passenger vehicle. The mechanism comprises a monitor assembly 8 rotatably attached to a monitor tilt means 5. Said monitor assembly 8 comprises a monitor 1 in a monitor housing 4. The monitor tilt means 5 is connected by a cable assembly 6, or other means, to a seat back transfer means 7. The monitor tilt means 5 and the monitor assembly 8 are located within the housing 2. The seat back transfer means 7 is located remote from the monitor assembly 8 and the monitor tilt means 5. FIG. 4 shows the automatic monitor tilt mechanism, as in FIG. 3, with the monitor tilted.

The automatic monitor tilt mechanism can be driven by the motion of the seat back 31. The cable assembly means 6 is used to transmit the seat back motion from the seat back transfer means 7 to the monitor tilt means 5. The cable means 6 is of fixed length so that movement of the seat back transfer means 7 will cause movement of the monitor tilt means 5. The cable assembly means 6 could comprise a cable of fixed length attached at one end to the monitor tilt means 5 and at the other end to the seat back transfer means 7 within a sheath fixed at both ends.

Figure 5:
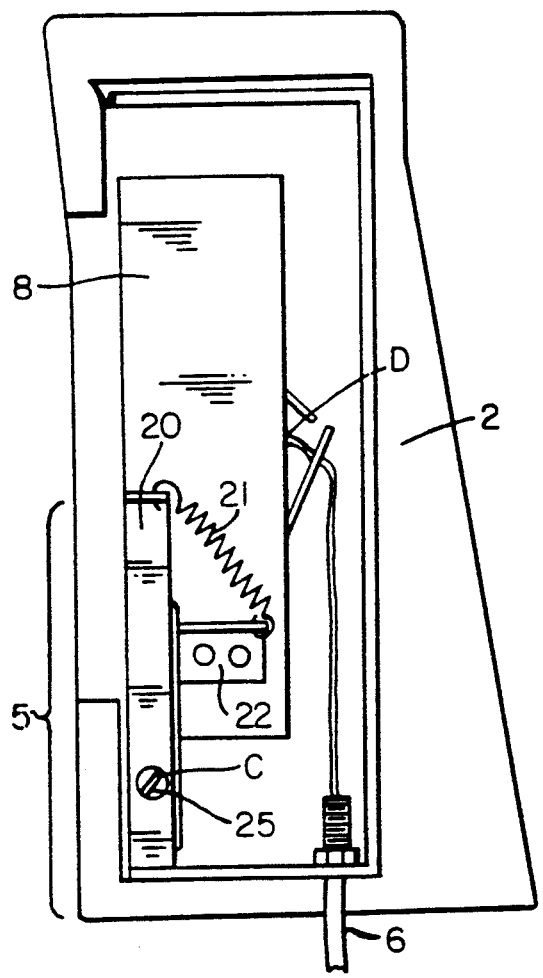
FIG. 5 is an enlarged side view of a monitor tilt means.
Figure 6:
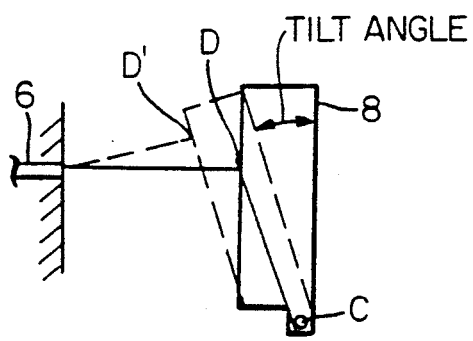
FIG. 6 is a view of the monitor showing the tilt position and displacement in phantom.

The monitor tilt means 5, as shown in FIG. 5, is attached to the monitor assembly 8. The operation of the monitor tilt means 5 is shown in FIG. 6. The pivot point C defines the axis about which the monitor assembly 8 rotates. Cable assembly 6 is attached to the monitor tilt means 5 at point D. The monitor assembly 8 is tilted by the action of the cable means 6 at point D. The monitor tilt means has a rotation radius substantially equal to the distance between C and D ("CD"). This rotation radius, CD, is substantially equal to the rotation radius of the seat back transfer means 7.

Monitor tilt means 5 comprises a hinge having a first leg means 22 attached to the monitor 1 and a second leg means 20 fixedly attached to the seat back. The first and second leg means are joined at a pivot 25, so that they can be moved with respect to each other. The monitor tilt means 5 may also include a monitor return spring 21 attached to ends of the first and second leg means located opposite the pivot 25.

Figure 7:
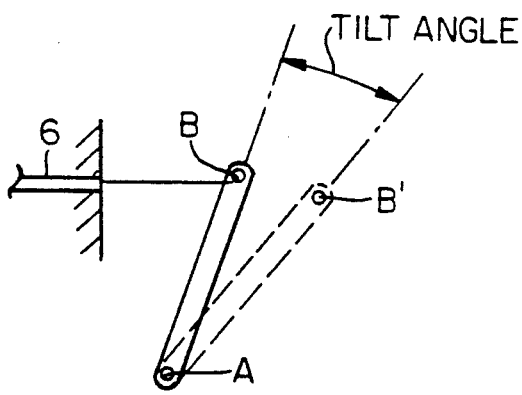
FIG. 7 shows a seat back transfer mechanism.

The operation of the seat back transfer means 7 is illustrated in FIG. 7. This device is located in the passenger seat in a manner enabling its movement to be driven by the movement of the seat back 31. The seat back transfer means 7 is located in the base of the seat back, see FIG. 1, and will have the same tilt motion as the seat back 31. Pivot point A is a fixed point that defines the axis about which the seat back transfer means 7 pivots as the seat back 31 reclines. The cable assembly 6 is attached to the seat back transfer means 7 at point B. The seat back transfer means rotation radius is the distance from A to B ("AB").

Seat back transfer means 7, as seen in FIG. 3, comprises a first arm 23 fixedly attached to a portion of the seat and a second arm 24 attached to the seat back 31. The second arm 24 is pivotally attached to the first arm 26 so that the second arm 24 moves with the seat back relative to the first arm 23.

The automatic monitor tilt mechanism works on the basis that equal rotation radii result in equal rotation angles. The seat back transfer means rotation radius AB is equal or proportional to the monitor tilt means rotation radius CD, i.e., $AB/CD = 1$. It should be noted that differential ratios may also be required in some applications.

Figure 8:
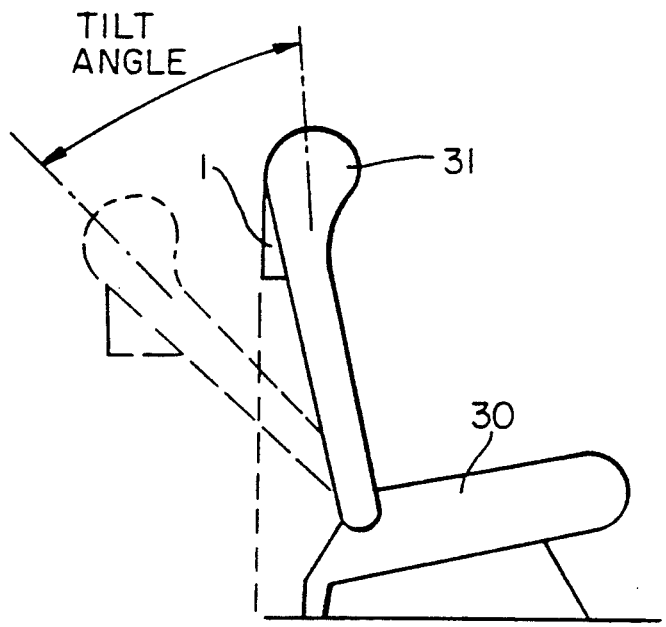
FIG. 8 shows the seat back with the monitor in an upright position and in a titled position.

The system operates in the following manner. Referring to FIG. 8 the seat back 31 is reclined or tilted by a passenger to a tilt angle. The seat back transfer means 7, when the seat back is tilted to angle, rotates around point A to an angle equal to (tilt angle of the seat back). Point B of the seat back transfer means 7 will rotate to point B', as shown in FIG. 7. The movement of point B to B' will displace the cable assembly a distance BB'. The motion of the seat back transfer means 7 caused by the movement of the sea back is transferred through the cable assembly 6 to the monitor tilt means 5. Referring to FIG. 6, Point D of the monitor tilt means 5 is moved to point D' a distance DD' by the displacement of the cable assembly. Distance DD' is equal to distance BB'. The movement in the monitor tilt means 5 causes the monitor assembly 8 to rotate about pivot point C. The monitor 1 rotates an angle equal to the tilt angle, as shown in FIG. 8. The change in the angle of the monitor is equal to the tilt angle of the seat back. The system can operate in such a way as to maintain a selected viewing angle throughout the normal range of movement of the seat back. The system can work on a mechanical basis or an electro mechanical basis.

Figure 9:
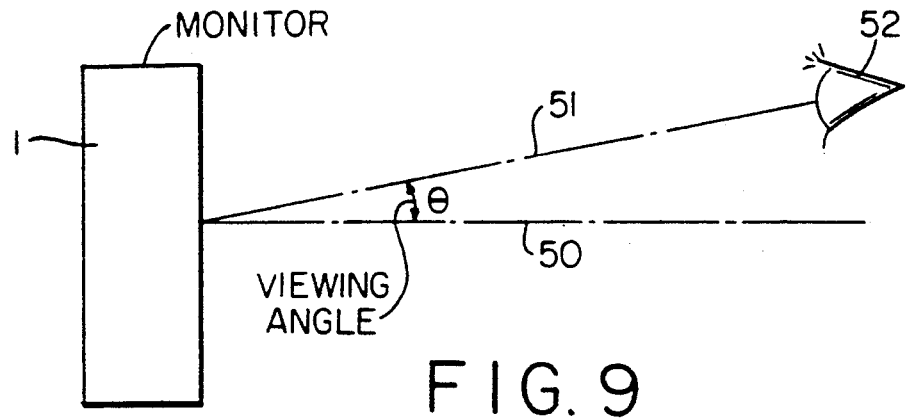
FIG. 9 shows a viewing angle.

Referring to FIG. 9, a viewing angle can be defined as the angle made by a line 50 drawn from a viewer 52 to the monitor and a line defining the horizontal axis of the monitor 51.

Features other than those specifically pointed out will readily occur to those versed in the art, as will many modifications in the preferred embodiment disclosed, all without departing from the spirit and scope of the invention.

What is claimed is:

1. An automatic tilt mechanism attaching a monitor to a reclinable seat back having a predetermined tilt angle range, the monitor being located in rear of the seat back, comprising:
   a hinge having a first leg means attached to the monitor, a second leg means attached to the reclinable seat back and a pivot joining the first and second leg means so that they can be moved with respect to each other after attachment;
   a transfer means adapted to move in proportion to movement of the reclinable seat back; and
   a connecting means for transmitting movement of the transfer means to the hinge so that the first leg means moves proportionally to the movement of the reclinable seat back such that the monitor will maintain a constant viewing angle with respect to a viewer through the predetermined tilt angle range.

2. The automatic tilt mechanism of claim 1, wherein said reclinable seat back comprises a portion of a seat in a passenger vehicle.

3. The automatic tilt mechanism of claim 2, wherein said transfer means comprises a first arm fixedly attached to a seat part of said seat, and a second arm attached to said seat back, said first and second arms being attached pivotally so that the second arm moves with the seat back relative to the first arm.

4. The automatic tilt mechanism of claim 1, or 3, wherein said connecting means is a cable assembly means.

5. The automatic tilt mechanism of claim 4, wherein said cable assembly means is a fixed length cable in a sheath.

6. The automatic tilt mechanism of claim 1, or 3, wherein said mechanism is driven by motion of the seat back.

7. The automatic tilt mechanism of claim 3, wherein the hinge further comprises a return spring attached to corresponding ends of said first and second leg means located opposite the pivot.

8. The automatic tilt mechanism of claim 3, wherein a first end of the connecting means is attached to the monitor and a second end of said connecting means is attached to said second arm of the transfer means.

9. A system for mounting a monitor in a reclinable seat back of a seat, comprising:
   a monitor tilt means rotatably attached to the monitor having a first leg means attached to the monitor and a second leg means fixedly attached to the reclinable seat back,
   a seat back transfer means located remote from the monitor and the monitor tilt means, having a first arm fixedly attached to a portion of the seat and a second arm attached to the seat back, said first and second arms being pivotally attached so that the second arm moves with the seat back relative to the first arm, and means connecting the monitor to said second arm of the transfer means so that movement of the seat back causes proportional movement of the seat back transfer means, the seat back transfer means adapted to cause proportional movement of the monitor to maintain a constant viewing angle of the monitor for a viewer.

10. The system of claim 9, wherein the monitor tilt means has a tilt angle and the transfer means has a corresponding tilt angle substantially equal to said monitor tilt means tilt angle.

11. The system of claim 9, wherein the connecting means is a fixed length cable assembly.

* * * * *